April 1, 1947. W. T. PEIRCE 2,418,192
STRANDED WIRE STRUCTURE FOR APPARATUS TOWING
Filed Dec. 7, 1943
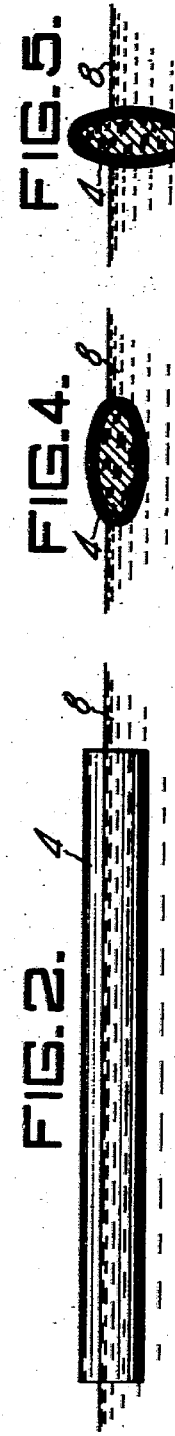
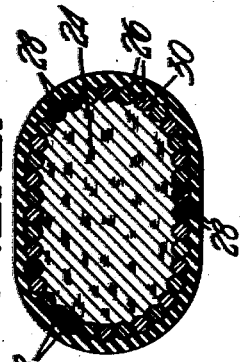
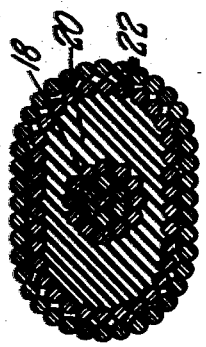
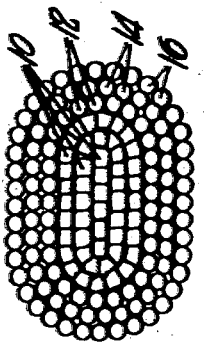
Inventor:
WALTER T. PEIRCE,
by John E. Jackson
his Attorney.

Patented Apr. 1, 1947

2,418,192

UNITED STATES PATENT OFFICE 2,418,192

STRANDED WIRE STRUCTURE FOR APPARATUS TOWING

Walter T. Peirce, Worcester, Mass., assignor to The American Steel and Wire Company of New Jersey, a corporation of New Jersey Application December 7, 1943, Serial No. 513,316

7 Claims. (Cl. 114—235)

This invention relates to a stranded wire structure for apparatus towing especially adapted for towing apparatus through water with the cable at least partly submerged. In electrical mine sweeping apparatus, the apparatus is fastened to the end of a cable and towed through the water with the other end of the cable connected to a ship. In place of mine sweeping apparatus, a microphone may be towed through the water to pick up sounds from subsurface vessels and likewise measuring logs for determining the distance the vessel has traveled may be towed. In most of these usages, it is necessary to transmit an electrical impulse from the object being towed to the towing vessel and for this purpose, an electrical conductor is required. If the vessel stops, the ordinary cable, which is heavier than water, would sink and drag the towed object under the water. Ordinarily a cable of round cross section is used for towing the apparatus, but I have found that such cable has a tendency to twist when passing through the water, the twisting causing unstranding of the cable with subsequent failure of the insulation.

It is an object of this invention to provide a stranded wire structure which overcomes the tendency to twist when towing an object through the water.

This and other objects will be more apparent after referring to the following specification and attached drawings, in which:

Figure 1 shows an object being towed through the water;

Figure 2 shows the normal position of the cable from points A to B in Figure 1;

Figure 3 shows a cable as twisted from D to C in Figure 1;

Figure 4 is a cross sectional view of the cable at point B of Figure 1;

Figure 5 is a cross sectional view of the cable at point C of Figure 1; and

Figures 6, 7 and 8 disclose various constructions of the cable.

Referring more particularly to the drawings, the reference numeral 2 indicates a vessel to the stern of which is connected a cable or stranded wire structure 4. To the free end of the cable 4 is attached mine sweeping apparatus 6. As a round cable passes through the water, it becomes twisted, causing unstranding of the cable with subsequent failure of the insulation. I have found that if a non-circular cable is used, it assumes a screw-like helical spiral as indicated in Figures 3 to 5. Such a screw-like spiral, when it engages a fluid body, has a tendency to twist the fluid or be itself twisted in a direction opposite to that which was put in a spiral in the first place. Consequently, when a non-circular cable is towed through the water the twisting action set up in the cable by virtue of the lay-up of the conductors therein will form the same screw-like surface on the outside and the engagement of this screw-like surface with the water will set up forces tending to twist the cable back again into its neutral position. The above action is obtained as long as the cable has a non-circular cross section, such as rectangular or as obtained by the use of fins on the cable. One axis through the cable must be appreciably longer than some other axis.

As is clearly shown in Figures 2 to 5, the cable 4 is partially submerged in the water 8. When the vessel 2 slows down or stops, there is danger that the object 6 will be dragged down by the cable 4 and also danger of the cable being fouled on the bottom of the body of water. Therefore, I prefer to use a cable which is lighter than water.

Figures 6 to 8 represent various types of oval cables which are suitable for apparatus towing. The cable of Figure 6 has an oval core 10 which is stranded in the ordinary manner and compacted by passing through rolls in order to obtain the oval shape. The core is built up in layers and each layer is put through rollers to form the desired cross section. Reverse layers of strands 12, 14 and 16, are laid over the core 10 to form the complete oval cross section of cable. The strands are made of electrical conducting material so that electrical impulses or signals may be passed from the article 6 being towed to the vessel 2.

Figure 7 discloses an insulated conductor made up in oval cross section. The cable consists of a central core 18 formed of stranded conductors and an oval shaped insulation 20 surrounding the core. Two layers of wires 22 are applied over the insulation 20 either as a concentric outer conductor or as the strength member for towing the cable. Two layers of outer strands are shown, but the same result is obtained if only one layer or more than two are provided.

Figure 8 shows a cable laid up over a non-conducting oval core 24 which may be composed of fibrous material, sponge rubber, cork, or other material ordinarily employed as cores for insulated cables. By making the core of cork or other like material the cable is made lighter than water. A layer of wires 26 is laid up over this core in an oval cross section. These wires may be bare or insulated from each other as desired. If it is desired to split the outer conductor into two or more sections, dummy conductors 28 of insulating material are provided between the groups of non-insulated wires. The entire cable is surrounded by insulation 30. It is recognized that oval conductors are used for other purposes, but insofar as I am aware, such conductors have not been used for towing apparatus through water.

While several embodiments of my invention have been shown and described, it will be apparent that other modifications and adaptations may be made without departing from the scope of the following claims.

I claim:

1. Apparatus for providing relative movement between a displaceable medium and an object free to rotate in said medium comprising means having relative motion with respect to the displaceable medium, and a stranded wire structure connecting said object and said means, said structure having a cross section with one axis appreciably longer than some other axis whereby its tendency to twist is resisted by the movement of the medium relative to the non-circular shape of the structure.

2. Apparatus for providing relative movement between water and an object free to rotate therein comprising means having relative motion with respect to the water, and a stranded wire structure connecting said object and said means, said structure having an oval cross section whereby its tendency to twist is resisted by the movement of the water relative to the non-circular shape of the structure.

3. Apparatus for towing through water an object free to rotate therein comprising a vessel movable in said water, a cable connecting said object and said vessel, said cable having a cross section with one axis appreciably longer than some other axis whereby its tendency to twist is resisted by the movement of the water relative to the non-circular shape of the structure, and the specific gravity of said cable being less than that of water.

4. Apparatus for towing through water an object free to rotate therein comprising a vessel movable in said water, a cable connecting said object and said vessel, said cable having an oval cross section whereby its tendency to twist is resisted by the movement of the water relative to the non-circular shape of the structure, and the specific gravity of said cable being less than that of water.

5. Apparatus for towing through water an object free to rotate therein comprising a vessel movable with respect to said water, and a cable connecting said object and said vessel, said cable having a cross section with one axis appreciably longer than some other axis whereby its tendency to twist is resisted by the movement of the water relative to the non-circular shape of the structure.

6. Apparatus for towing through water an object free to rotate therein comprising a vessel movable with respect to said water, and a cable connecting said object and said vessel, said cable having an oval cross section whereby its tendency to twist is resisted by the movement of the water relative to the non-circular shape of the structure.

7. Apparatus for providing relative movement between a displaceable medium and an object free to rotate in said medium comprising means having relative motion with respect to the displaceable medium, and a stranded structure connecting said object and said means, said structure having a cross section with one axis appreciably longer than some other axis whereby its tendency to twist is resisted by the movement of the medium relative to the non-circular shape of the structure.

WALTER T. PEIRCE.

REFERENCES CITED

The following references are of record in the file of this patent:

UNITED STATES PATENTS

| Number | Name | Date |
| --- | --- | --- |
| 2,217,276 | Hill | Oct. 8, 1940 |
| 1,393,750 | Carter | Oct. 18, 1921 |
| 608,911 | Reed | Aug. 9, 1898 |
| 2,180,731 | Dickinson | Nov. 21, 1939 |
| 2,003,990 | Carlson | June 4, 1935 |
| 1,756,972 | Conner | May 6, 1930 |
| 2,003,245 | Carey | May 28, 1935 |